United States Patent
Zhao et al.

(10) Patent No.: US 9,804,638 B2
(45) Date of Patent: Oct. 31, 2017

(54) SUBSTANTIALLY TRANSPARENT HINGED SUBSTRATE APPARATUS

(75) Inventors: Chengxue Zhao, Shanghai (CN); Ming Zhang, Shanghai (CN); Congtao Jiang, Shanghai (CN); Alan Tate, Puyallup, WA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/976,017

(22) PCT Filed: Nov. 3, 2011

(86) PCT No.: PCT/CN2011/081732
§ 371 (c)(1),
(2), (4) Date: Jul. 1, 2014

(87) PCT Pub. No.: WO2013/063782
PCT Pub. Date: May 10, 2013

(65) Prior Publication Data
US 2014/0368983 A1    Dec. 18, 2014

(51) Int. Cl.
*G06F 1/16* (2006.01)
*B43L 3/00* (2006.01)

(52) U.S. Cl.
CPC .............. *G06F 1/1681* (2013.01); *B43L 3/00* (2013.01); *B43L 3/008* (2013.01); *G06F 1/1637* (2013.01); *G06F 1/1656* (2013.01); *G06F 1/1662* (2013.01)

(58) Field of Classification Search
CPC .... G06F 1/1616; G06F 1/1637; G06F 1/1643; G06F 1/1647; G06F 1/1649;
(Continued)

(56) References Cited

U.S. PATENT DOCUMENTS 6,259,597 B1 * 7/2001 Anzai ................... G06F 1/1616
    345/169
6,474,823 B1 * 11/2002 Agata ............... G02F 1/133308
    349/58

(Continued)

FOREIGN PATENT DOCUMENTS

CN    201035465 Y    3/2008
CN    201700126 U    1/2011
(Continued)

OTHER PUBLICATIONS

International Search Report and Written Opinion, Mailed Date: Jul. 26, 2012, Application No. PCT/CN2011/081732. Filed Date: Nov. 3, 2011, pp. 12.

*Primary Examiner* — Hoa C Nguyen
*Assistant Examiner* — Christopher L Augustin (57) ABSTRACT

In various embodiments, a transparent hinged substrate apparatus integrated into a portable computer may address common deficiencies associated with space limitations on student desktop surfaces. The transparent hinged substrate apparatus may utilize, in some embodiments, a transparent substrate that is positioned between the display side and the keypad side of a portable computer. The transparent hinged substrate apparatus may be movable into multiple positions including one position that covers the keypad side of the portable computer without touching any of the keys of the keypad. Thus, the keypad surface may now be used as a work surface using the same physical space occupied by the portable computer.

19 Claims, 4 Drawing Sheets

(58) Field of Classification Search
CPC .... G06F 1/1673; G06F 1/1692; G06F 1/1666; G06F 1/1667; G06F 1/1669
See application file for complete search history.

(56) References Cited

U.S. PATENT DOCUMENTS

| | | | | |
|---|---|---|---|---|
| 2008/0024388 A1* | 1/2008 | Bruce | ................... | G06F 1/1616 345/1.1 |
| 2008/0084396 A1* | 4/2008 | Pen | ................... | G06F 1/1616 345/168 |
| 2009/0000830 A1* | 1/2009 | Kim | ................... | G06F 1/1616 178/18.03 |
| 2010/0053864 A1* | 3/2010 | Nelson | ................... | A45D 40/18 361/679.02 |
| 2010/0128428 A1* | 5/2010 | Yu | ................... | G06F 1/169 361/679.27 |
| 2010/0142133 A1* | 6/2010 | Wang | ................... | G06F 1/1616 361/679.01 |

FOREIGN PATENT DOCUMENTS

| | | |
|---|---|---|
| CN | 202169816 U | 3/2012 |
| JP | 2005014212 A | 1/2005 |

\* cited by examiner

SUBSTANTIALLY TRANSPARENT HINGED SUBSTRATE APPARATUS

BACKGROUND

Laptop computers are commonly used by students in classrooms. Often the classroom size is limited thereby limiting the personal space of a student's work area. A student may be perform multiple tasks in a given class period on their work surface whether it is an individual desk or a section of a table top. Often this work space is limited to the point where a student may not be able to operate a laptop computer and still have sufficient space to take notes or open a book. Accordingly, there may be a need for improved techniques to solve these and other problems.

DETAILED DESCRIPTION

In various embodiments, a transparent hinged substrate apparatus integrated into a portable computer may address common deficiencies associated with space limitations on student desktop surfaces. The transparent hinged substrate apparatus may utilize, in some embodiments, a transparent substrate that is positioned between the display side and the keypad side of a portable computer. The transparent hinged substrate apparatus may be movable into multiple positions including one position that covers the keypad side of the portable computer without touching any of the keys of the keypad. Thus, the keypad surface may now be used as a work surface using the same physical space occupied by the portable computer.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
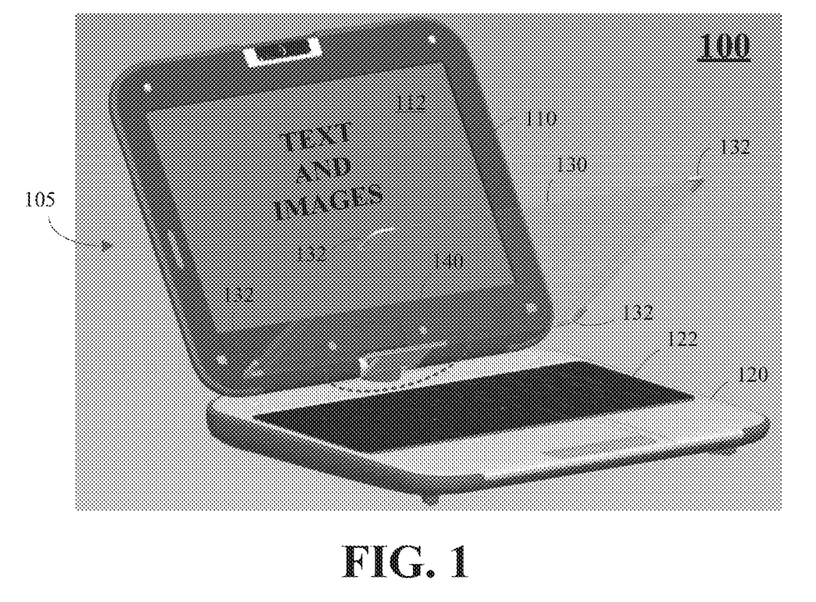
FIG. 1 illustrates an embodiment of a transparent hinged substrate apparatus affixed to a portable computer in which a transparent substrate is positioned between a display and a keypad of the portable computer.

FIG. 1 illustrates an embodiment of a transparent hinged substrate apparatus 100 affixed to a portable computer 105 in which a transparent substrate 130 is positioned between a display 112 and a keypad 122 of the portable computer 105.

The portable computer 105 may be of the type generally known as a laptop or notebook computer. The portable computer may include a screen housing 110 and a keypad housing 120 that are coupled together. The portable computer 105 may be folded in a first configuration to resemble a closed notebook in which the screen housing 110 may be positioned above and substantially parallel to the keypad housing 120. The portable computer 105 may be open in a second configuration to resemble a partially open notebook in which the screen housing 110 may be perpendicular to the keypad housing 120 along a shared edge. The screen housing 110 and a keypad housing 120 of portable computer 105 may be in a pivotal relationship to one another about a computer hinge mechanism.

The transparent hinged substrate apparatus 100 includes a transparent substrate 130 coupled to a substrate hinge mechanism 140. The substrate hinge mechanism 140 may be affixed to the portable computer 105. The substrate hinge mechanism 140 may be operative to allow the transparent substrate 130 to be moved into multiple configurations.

In one embodiment, the transparent substrate 130 may be substantially rectangular in shape and large enough to completely cover the display 112 of the portable computer 105 in a first configuration and the keypad 122 of the portable computer 105 in a second configuration. It may be appreciated, however, that the transparent substrate 130 may be in any shape or geometry arranged to approximate a corresponding surface area of the portable computer 105. The embodiments are not limited in this context.

The transparent substrate 130 may include bumpers 132. The bumpers 132 may be positioned substantially about each corner of the substantially rectangular transparent substrate 130. In one embodiment, the bumpers 132 may be comprised of rubber. In another embodiment, the bumpers 132 may be comprised of plastic. Other suitable hard and soft materials may be used for the bumpers 132 as well having sufficient physical properties to prevent the transparent substrate 130 from making contact with various surfaces of the portable computer 105 and also to reduce or prevent damage to contact surfaces on the portable computer 105. The embodiments are not limited to these examples.

In one embodiment, the transparent substrate 130 may be comprised of a transparent or translucent material, such as a polymer. In another embodiment, the transparent substrate 130 may be comprised of acrylic. In another embodiment, the transparent substrate 130 may be comprised of glass. Other suitable materials may be used for the transparent substrate 130 arranged to provide varying levels of transparency to allow objects, such as a screen, to be viewed through the transparent substrate 130. Furthermore, the transparent substrate 130 should be of suitable rigidity to remain substantially parallel to a surface of the portable computer 105 when pressure is applied to the surface of the transparent substrate 130. For instance, a human being may place an object, such as a piece of writing paper, on the surface of the transparent substrate 130, and write on the writing paper applying a corresponding amount of force or pressure on the transparent substrate 130. The transparent substrate 130 may be arranged to provide a defined amount of movement that is less than a defined space buffer between the transparent substrate 130 and a surface of the portable computer 105 (e.g., a key board). Some factors to consider in selecting a suitable material for the transparent substrate 130 may include strength, thickness, weight, and cost, among others. The embodiments are not limited to these examples.

Figure 2:
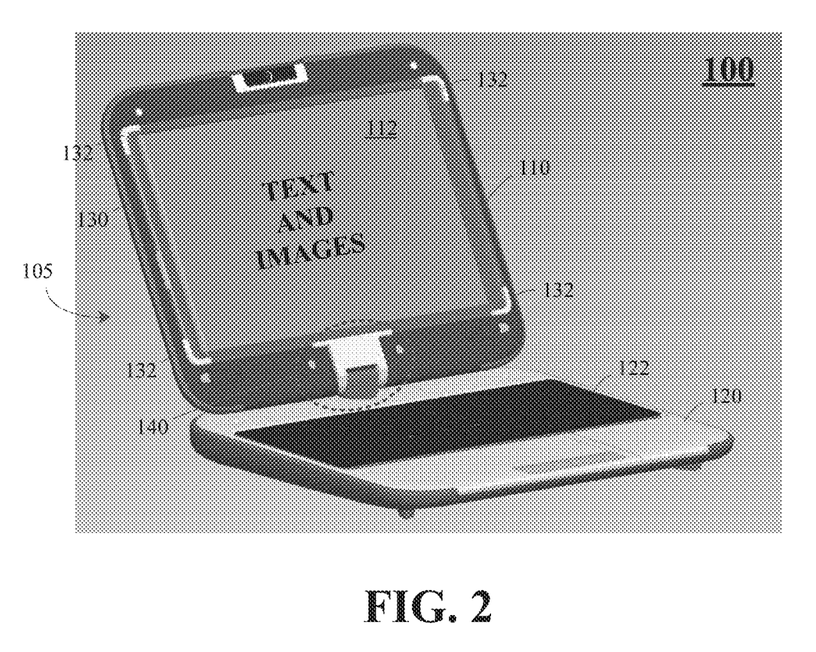
FIG. 2 illustrates an embodiment of the transparent hinged substrate apparatus affixed to the portable computer in which the transparent substrate is positioned against the display of the portable computer.

FIG. 2 illustrates an embodiment of the transparent hinged substrate apparatus 100 affixed to the portable computer 105 in which the transparent substrate 130 is positioned against the display 112 of the portable computer 105. The transparent substrate 130 may pivot about the substrate hinge mechanism 140 and may be able to cover the display 112 of the portable computer 105 in a first configuration.

The bumpers 132 may prevent the transparent substrate 130 from contacting the display 112 by creating a space buffer of a defined first dimension (e.g., a first height) between the transparent substrate 130 and a surface of the portable computer 105, such as display 112 and the keypad 122, for example. If the transparent substrate 130 is moved such that it covers the display 112, the bumpers 132 will prevent the surface of the transparent substrate 130 from contacting the display 112. The bumpers 132 may contact the screen housing 110 on the outer periphery of the display 112 thereby preventing the transparent substrate 130 from contacting the display 112.

In this configuration, the transparent substrate 130 may not interfere with the normal use of the portable computer 105. Since the transparent substrate 130 is transparent, text and graphics present on display 112 can be seen normally. While the transparent substrate 130 covers the display 112, the keypad remains accessible for user input.

Figure 3:
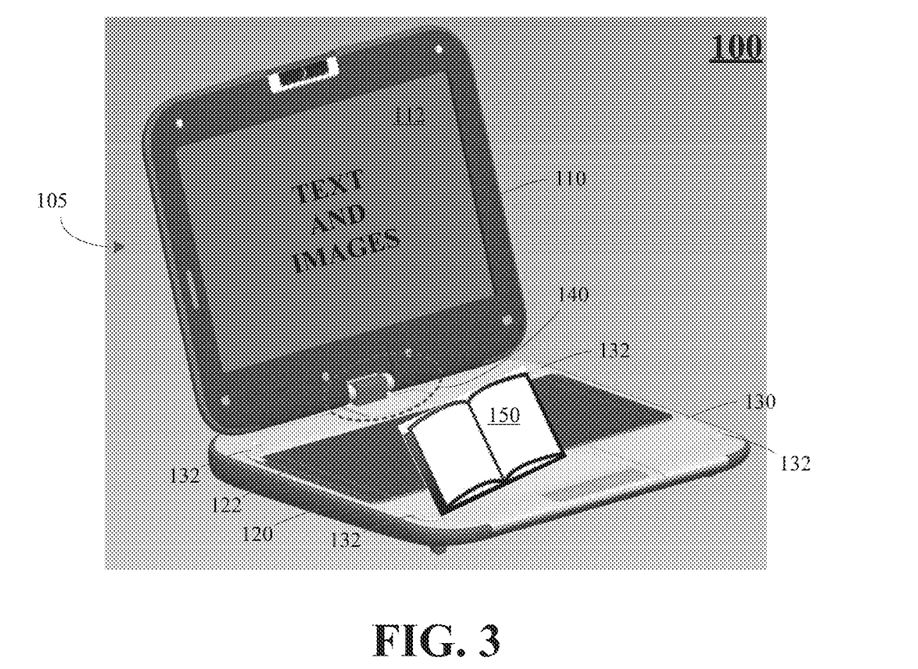
FIG. 3 illustrates an embodiment of the transparent hinged substrate apparatus affixed to the portable computer in which the transparent substrate is positioned just above the keypad of the portable computer.

FIG. 3 illustrates an embodiment of the transparent hinged substrate apparatus 100 affixed to the portable computer 105 in which the transparent substrate 130 is positioned just above the keypad 122 of the portable computer 105. The transparent substrate 130 may pivot about the substrate hinge mechanism 140 and may be able to cover the keypad 122 of the portable computer 105 in a second configuration.

The bumpers 132 may prevent the transparent substrate 130 from contacting the keypad 122 by creating a space buffer of a defined second dimension (e.g., a second height). If the transparent substrate 130 is moved such that it covers the keypad 122, the bumpers 132 will prevent the surface of the transparent substrate 130 from contacting the keypad 122. The bumpers 132 may contact the keypad housing 120 on the outer periphery of the keypad 122 thereby preventing the transparent substrate 130 from contacting the keypad 122. This also prevents accidental user input to the keypad 122 when the transparent substrate 130 is in this position. It may be appreciated that the first and second defined dimensions may be the same or different, and the embodiments are not limited in this context.

In this configuration, the transparent substrate 130 may act as a desktop surface. Items such as a book 150 or a pad of paper (not shown) can be placed atop the transparent substrate 130 without contacting the keypad. Thus, in this configuration, a user may not be able to accidentally provide input to the portable computer 105 through contact with the keypad 112 since the keypad 112 is not accessible.

Figure 4:
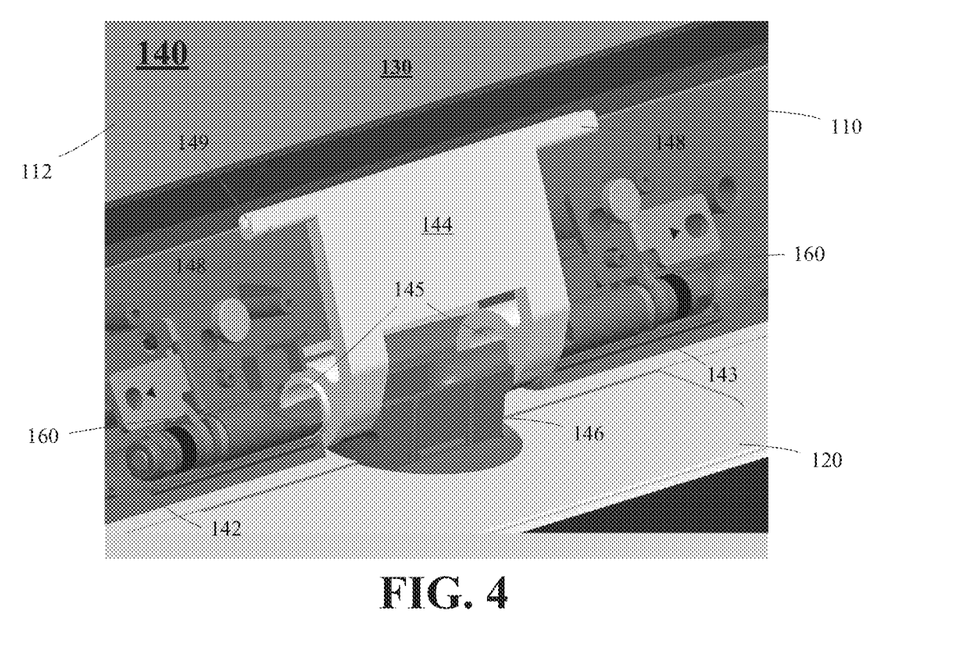
FIG. 4 illustrates a substrate hinge mechanism for an embodiment of the transparent hinged substrate apparatus affixed to the portable computer.

FIG. 4 illustrates a substrate hinge mechanism 140 for an embodiment of the transparent hinged substrate apparatus 100 affixed to the portable computer 105. The substrate hinge mechanism 140 may include a substrate hinge pin component 142, a body portion 144, a base component 146, and a seating component 148.

The substrate hinge pin component 142 may be coupled to the screen housing 110 of the portable computer 105 by way of a computer pin attachment component 160. The computer pin attachment component 160 may be affixed to the screen housing 110. The computer pin attachment component 160 may include a substantially ring shaped portion. The substrate hinge pin component 142 may be operatively coupled through the computer pin attachment component 160 ring opening to allow screen housing 110 to move with respect to keypad housing 120.

A sleeve component 143 may surround at least a portion of the substrate hinge pin component 142. The sleeve component 143 may be capable of rotating about the substrate hinge pin component 142. The body portion 144 may include a bored out portions 145. The sleeve component 143 may be threaded through the bored out portions 145 of the body portion 144 of the substrate hinge mechanism 140. The sleeve component 143 may be kept in contact with the body portion such that the sleeve component may rotate when the body portion 144 rotates. The embodiments are not limited to this example.

The base component 146 may be in a cooperative relationship with the sleeve component 143. The sleeve component 143 may be seated within the base component 146 such that the sleeve component may still rotate about its axis. The base component may be affixed to the keypad housing 110.

In some embodiments, the substrate hinge pin component 142 and a computer hinge mechanism pin component may be the same component. In such embodiments, the substrate hinge pin component 142 may serve a dual purpose. The substrate hinge pin component 142 may be simultaneously operative with both the computer hinge mechanism and the substrate hinge mechanism 140.

In another embodiment, the base component may be affixed to the screen housing 110 and the substrate hinge pin component 142 may be coupled to the keypad housing 120 of the portable computer 105. The embodiments are not limited to this example.

The seating component 148 may include a slotted area 149 operative to receive and seat the transparent substrate 130. The width of slotted area 149 may be slightly wider than the thickness of the transparent substrate 130. The transparent substrate 130 may be wedged into the slotted area 149 and held in place by tension between the walls of the slotted area 149 and the front and back surfaces of the transparent substrate 130. in another embodiment, the slotted area may include small one or more threaded bores (not shown) operative to receive one or more set screws (not shown). The transparent substrate 130 may be inserted into the slotted area 149. The one or more set screws may then be threaded into the one or more threaded bores until the tip of the set screws contact a surface of the transparent substrate 130. The transparent substrate 130 may be removable from the seating component and may be replaced if damaged.

Figure 5:
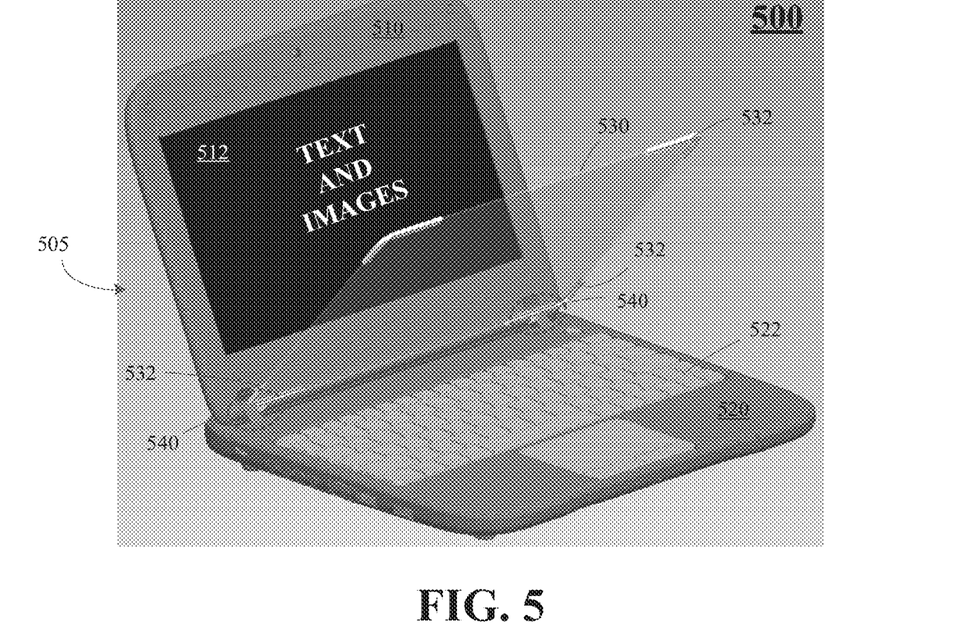
FIG. 5 illustrates another embodiment of a transparent hinged substrate apparatus affixed to a portable computer in which a transparent substrate is positioned between a display and a keypad of the portable computer.

FIG. 5 illustrates another embodiment of a transparent hinged substrate apparatus 500 affixed to a portable computer 505 in which a transparent substrate 530 is positioned between a display 512 and a keypad 522 of the portable computer 505.

The portable computer 505 may be of the type generally known as a laptop or notebook computer. The portable computer may include a screen housing 510 and a keypad housing 520 that are coupled together. The portable computer 505 may be folded in a first configuration to resemble a closed notebook in which the screen housing 510 may be positioned above and substantially parallel to the keypad housing 520. The portable computer 505 may be open in a second configuration to resemble a partially open notebook in which the screen housing 510 may be perpendicular to the keypad housing 520 along a shared edge. The screen housing 510 and a keypad housing 520 of portable computer 505 may be in a pivotal relationship to one another about a computer hinge mechanism.

The transparent hinged substrate apparatus 500 includes a transparent substrate 530 coupled to a substrate hinge mechanism 540. The substrate hinge mechanism 540 may be affixed to the portable computer 505. The substrate hinge mechanism 540 may be operative to allow the transparent substrate 530 to be moved into multiple configurations.

The transparent substrate 530 may be substantially rectangular in shape and large enough to completely cover the display 512 of the portable computer 505 in a first configuration and the keypad 522 of the portable computer 505 in a second configuration.

The transparent substrate 530 may include bumpers 532. The bumpers 532 may be positioned substantially about each corner of the substantially rectangular transparent substrate 530. In one embodiment, the bumpers 132 may be comprised of rubber. In another embodiment, the bumpers 532 may be comprised of plastic. The embodiments are not limited to these examples.

In one embodiment, the transparent substrate 530 may be comprised of a transparent polymer. In another embodiment, the transparent substrate 530 may be comprised of acrylic. In another embodiment, the transparent substrate 530 may be comprised of glass. The embodiments are not limited to these examples.

Figure 6:
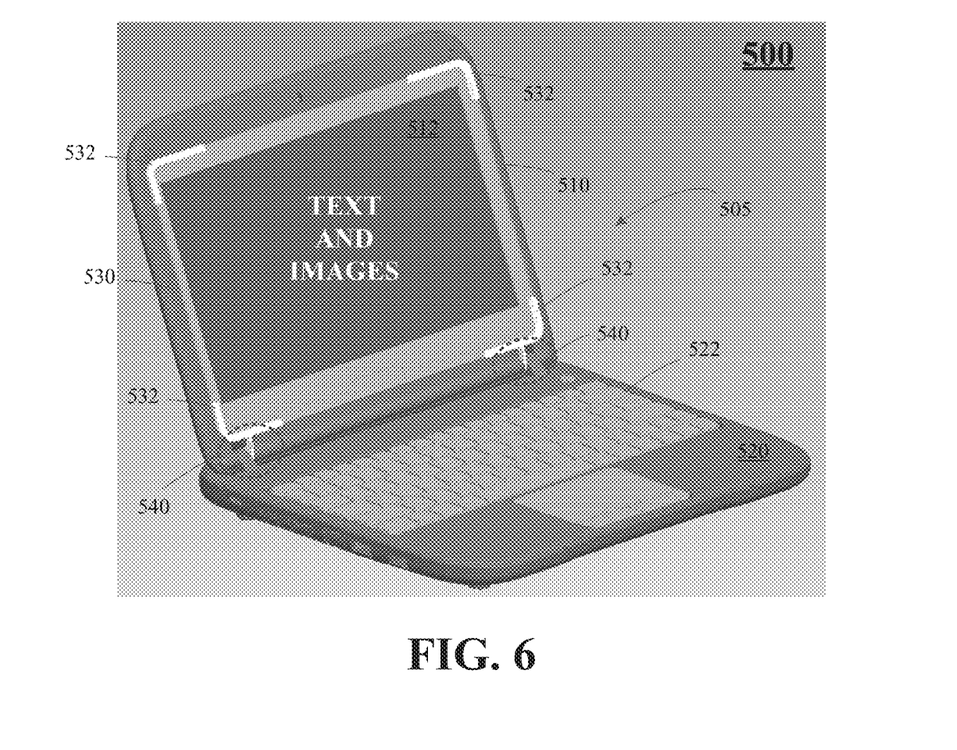
FIG. 6 illustrates an embodiment of the transparent hinged substrate apparatus affixed to the portable computer in which the transparent substrate is positioned against the display of the portable computer.

FIG. 6 illustrates an embodiment of the transparent hinged substrate apparatus 500 affixed to the portable computer 505 in which the transparent substrate 530 is positioned against the display 512 of the portable computer 505. The transparent substrate 530 may pivot about the substrate hinge mechanism 540 and may be able to cover the display 512 of the portable computer 505 in a first configuration.

The bumpers 532 may prevent the transparent substrate 530 from contacting the display 512 by creating a space buffer. If the transparent substrate 530 is moved such that it covers the display 512, the bumpers 532 will prevent the surface of the transparent substrate 530 from contacting the display 512. The bumpers 532 may contact the screen housing 510 on the outer periphery of the display 512 thereby preventing the transparent substrate 530 from contacting the display 512.

In this configuration, the transparent substrate 530 may not interfere with the normal use of the portable computer 505. Since the transparent substrate 530 is transparent, text and graphics present on display 512 can be seen normally. While the transparent substrate 530 covers the display 512, the keypad remains accessible for user input.

Figure 7:
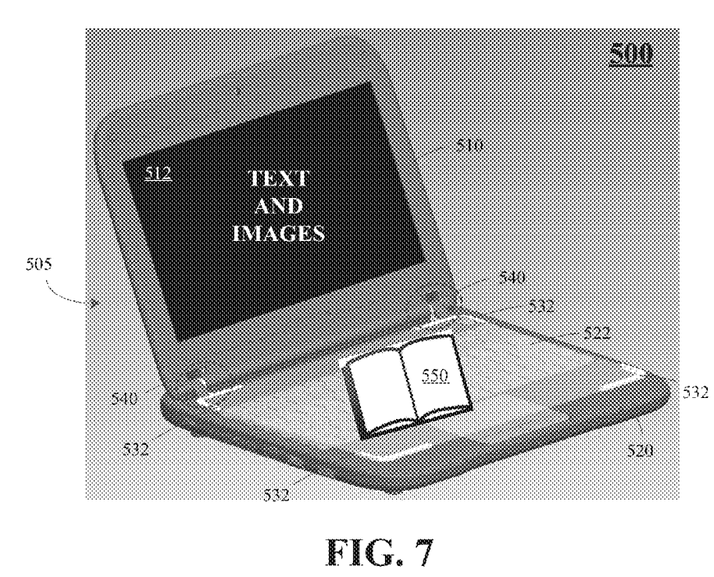
FIG. 7 illustrates an embodiment of the transparent hinged substrate apparatus affixed to the portable computer in which the transparent substrate is positioned just above the keypad of the portable computer.

FIG. 7 illustrates an embodiment of the transparent hinged substrate apparatus 500 affixed to the portable computer 505 in which the transparent substrate 530 is positioned just above the keypad 522 of the portable computer 505. The transparent substrate 530 may pivot about the substrate hinge mechanism 540 and may be able to cover the keypad 522 of the portable computer 505 in a second configuration.

The bumpers 532 may prevent the transparent substrate 530 from contacting the keypad 522 by creating a space buffer. If the transparent substrate 530 is moved such that it covers the keypad 522, the bumpers 532 will prevent the surface of the transparent substrate 530 from contacting the keypad 522. The bumpers 532 may contact the keypad housing 520 on the outer periphery of the keypad 522 thereby preventing the transparent substrate 530 from contacting the keypad 522. This also prevents accidental user input to the keypad 522 when the transparent substrate 530 is in this position.

In this configuration, the transparent substrate 530 may act as a desktop surface. Items such as a book 550 or a pad of paper (not shown) can be placed atop the transparent substrate 530 without contacting the keypad. Thus, in this configuration, a user may not be able to accidentally provide input to the portable computer 505 through contact with the keypad 512 since the keypad 512 is not accessible.

Figure 8:
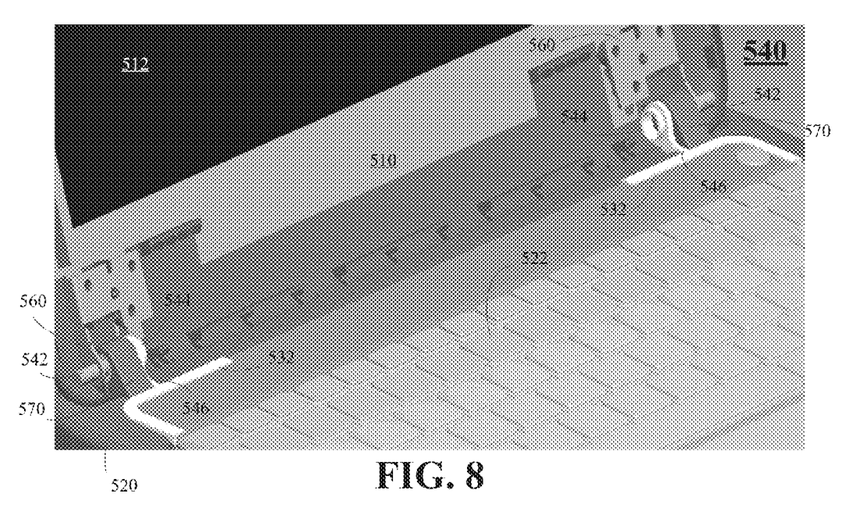
FIG. 8 illustrates a substrate hinge mechanism for an embodiment of the transparent hinged substrate apparatus affixed to the portable computer.

FIG. 8 illustrates a substrate hinge mechanism 540 for an embodiment of the transparent hinged substrate apparatus 500 affixed to the portable computer 505. The substrate hinge mechanism 540 may include a substrate hinge pin component 542, a body portion 544, and a seating component 546.

The substrate hinge pin component 542 may be coupled to the screen housing 510 of the portable computer 505 by way of a computer pin attachment component 560. The computer pin attachment component 560 may be affixed to the screen housing 510. The computer pin attachment component 560 may include a substantially ring shaped portion. A keypad housing pin attachment component 570 may be affixed to the keypad housing 520. The keypad housing pin attachment component 570 may include a ring portion. The substrate hinge pin component 542 may be operatively coupled through the computer pin attachment component 560 ring opening and the keypad housing pin attachment component 570 ring opening to allow screen housing 510 to move with respect to keypad housing 520.

In some embodiments, the substrate hinge pin component 542 and a computer hinge mechanism pin component may be the same component. In such embodiments, the substrate hinge pin component 542 may serve a dual purpose. The substrate hinge pin component 542 may be simultaneously operative with both the computer hinge mechanism and the substrate hinge mechanism 540. The computer hinge mechanism may be comprised of the computer pin attachment component 560 and the keypad housing pin attachment component 570.

The seating component 546 may include a slotted area (not visible) operative to receive and seat the transparent substrate 530. The width of slotted area may be slightly wider than the thickness of the transparent substrate 530. The transparent substrate 530 may be wedged into the slotted area and held in place by tension between the walls of the slotted area and the front and back surfaces of the transparent substrate 530. In another embodiment, the slotted area may include small one or more threaded bores (not shown) operative to receive one or more set screws (not shown). The transparent substrate 530 may be inserted into the slotted area. The one or more set screws may then be threaded into the one or more threaded bores until the tip of the set screws contact a surface of the transparent substrate 530. The transparent substrate 530 may be removable from the seating component and may be replaced if damaged.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A portable computer comprising:
   a screen housing;
   a keypad housing including an integrated keypad, the screen housing and the keypad housing movable with respect to one another to allow for an open configuration and a closed configuration of the portable computer;
   a substantially transparent substrate pivotably coupled to the personal computer, the substantially transparent substrate movable, when the portable computer is in the open configuration, to a first position to cover at least a portion of the screen housing and movable to a second position to cover at least a portion of the keypad housing, the substantially transparent substrate to prevent accidental user input to the portable computer while in the second position; and
   a substrate hinge mechanism to couple the screen housing to the keypad housing and the substantially transparent substrate between the screen housing and the keypad housing, the substrate hinge mechanism comprising a seating component having a slotted area operative to receive and seat the substantially transparent substrate, the substantially transparent substrate removable from the substrate hinge mechanism.

2. The portable computer of claim 1 wherein the substantially transparent substrate further comprises bumper elements operative to prevent a surface of the substantially transparent substrate from contacting the keypad integrated into the keypad housing.

3. The portable computer of claim 2 wherein the bumper elements are comprised of rubber.

4. The portable computer of claim 2 wherein the bumper elements are comprised of plastic.

5. The portable computer of claim 2 wherein the bumper elements are positioned about the transparent substrate.

6. The portable computer of claim 1 wherein the substantially transparent substrate is comprised of a transparent polymer material.

7. The portable computer of claim 1 wherein the substantially transparent substrate is comprised of clear acrylic.

8. The portable computer of claim 1 wherein the substantially transparent substrate is comprised of glass.

9. An apparatus comprising:
   a substantially transparent substrate; and
   a substrate hinge mechanism comprising a seating component having a slotted area operative to receive and seat the substantially transparent substrate and coupling the substantially transparent substrate to a portable computer comprising a screen housing and a keypad housing including an integrated keypad, wherein the screen housing and the keypad housing are movable with respect to one another to allow for an open configuration and a closed configuration of the portable computer, the substantially transparent substrate removable from the substrate hinge mechanism and movable, when the portable computer is in the open configuration, to a first position to cover at least a portion of the screen housing and movable to a second position to cover at least a portion of the keypad housing, the substantially transparent substrate to prevent accidental user input to the portable computer while in the second position.

10. The apparatus of claim 9 wherein the substrate hinge mechanism is operative to permit the substantially transparent substrate to cover at least a portion of the screen housing such that the keypad housing is accessible when the portable computer is in the open configuration.

11. The apparatus of claim 9 wherein the substrate hinge mechanism is operative to permit the substantially transparent substrate to cover at least a portion of the keypad housing when the portable computer is in the open configuration.

12. The apparatus of claim 9 wherein the substantially transparent substrate further comprises bumper elements operative to prevent a surface of the substantially transparent substrate from contacting the keypad integrated into the keypad housing regardless of the position of the substantially transparent substrate.

13. The apparatus of claim 12 wherein the bumper elements are comprised of rubber.

14. The apparatus of claim 12 wherein the bumper elements are comprised of plastic.

15. The apparatus of claim 12 wherein the bumper elements are positioned about the transparent substrate.

16. The apparatus of claim 9 wherein the substantially transparent substrate is comprised of a transparent polymer material.

17. The apparatus of claim 9 wherein the substantially transparent substrate is comprised of clear acrylic.

18. The apparatus of claim 9 wherein the substantially transparent substrate is comprised of glass.

19. The apparatus of claim 9 comprising multiple substrate hinge mechanisms capable of holding the substantially transparent substrate and coupling the substantially transparent substrate to the portable computer.

* * * * *